United States Patent
Zhang et al.

(10) Patent No.: US 8,542,745 B2
(45) Date of Patent: Sep. 24, 2013

(54) METHOD FOR VIDEO DECODING SUPPORTED BY GRAPHICS PROCESSING UNIT

(75) Inventors: Hui Zhang, Beijing (CN); Li Hua Zhu, San Jose, CA (US); Charles Chuanming Wang, Beijing (CN)

(73) Assignee: Thomson Licensing, Boulogne, Billancourt (FR)

( * ) Notice: Subject to any disclaimer, the term of this patent is extended or adjusted under 35 U.S.C. 154(b) by 545 days.

(21) Appl. No.: 12/590,978

(22) Filed: Nov. 17, 2009

(65) Prior Publication Data

US 2010/0135418 A1 Jun. 3, 2010

(30) Foreign Application Priority Data

Nov. 28, 2008 (EP) .................................... 08305871

(51) Int. Cl.
*H04N 11/02* (2006.01)
(52) U.S. Cl.
USPC ................. 375/240.25; 375/240.16; 345/505; 345/502
(58) Field of Classification Search
USPC ................. 375/240.16, 240.25; 345/505, 502
See application file for complete search history.

(56) References Cited

U.S. PATENT DOCUMENTS

2004/0190617 A1 9/2004 Shen et al.

FOREIGN PATENT DOCUMENTS

WO WO2007/148355 12/2007
WO WO 2007148355 A1 * 12/2007

OTHER PUBLICATIONS

Pieters,B. et al., Performance Evaluation of H.264/AVC Decoding and Visualization using the GPU, Aug. 28, 2007, SPIE-INT Soc Optical Engineering, vol. 6696, pp. 1-13.*
Hirvonen,A. et al., H.263 Video Decoding on Programmable Graphics Hardware, Jan. 23, 2006, Proceedings of the 5th IEEE International Symposium on Signal Processing and Information Technology, pp. 902-907.*
Pieters et al. ("Performance Evaluation of H.264/AVC Decoding and Visualization using the GPU", Proc. SPIE, vol. 6696, pp. 1-13, Aug. 28, 2007).*
Chen et al. ("H.264/AVC Motion Estimation Implementation on Compute Unified Device Architecture (CUDA)", Multimedia and Expo, 2008 IEEE International Conference on , vol., No., pp. 697,700, Jun. 23, 2008-Apr. 26, 2008).*
Hirvonen et al. ("H.263 Video Decoding on Programmable Graphics Hardware", Proceedings of the fifth IEEE International Symposium on Signal Processing and Information Technology, pp. 902-907, Dec. 21, 2005).*

(Continued)

*Primary Examiner* — Christopher S Kelley
*Assistant Examiner* — Maria Vazquez Colon
(74) *Attorney, Agent, or Firm* — Jeffrey D. Carter

(57) ABSTRACT

A method for utilizing a CUDA based GPU to accelerate a complex, sequential task such as video decoding, comprises decoding on a CPU headers and macroblocks of encoded video, performing inverse quantization (on CPU or GPU), transferring the picture data to GPU, where it is stored in a global buffer, and then on the GPU performing inverse waveform transforming of the inverse quantized data, performing motion compensation, buffering the reconstructed picture data in a GPU global buffer, determining if the decoded picture data are used as reference for decoding a further picture, and if so, copying the decoded picture data from the GPU global buffer to a GPU texture buffer. Advantages are that the data communication between CPU and GPU is minimized, the workload of CPU and GPU is balanced and the modules off-loaded to GPU can be efficiently realized since they are data-parallel and compute-intensive.

18 Claims, 9 Drawing Sheets

(56) References Cited

OTHER PUBLICATIONS

Pieters B. et al.: "Performance Evaluation of H.264//AVC Decoding and Visualization using the GPU" Proc. SPIE, vo. 6696, Aug. 28, 2007, pp. 1-13, San Diego, CA. USA.

Hirvonen A. et al.: "H.263 video decoding on programmable graphics hardware" Signal Processing and Information Technology, 2005. Proceedings of the Fifth IEEE International Symposium on Athens, Greece Dec. 18-21, 2005, Piscataway, NJ, USA IEEE Dec. 18, 2005, p. 902-907. p. 902, section 1, pp. 902-904. section II, paragraphs A-G, pp. 905-906, sectin IV, paragraphs B-D.

Shen G. et al.: "Accelerate Video Decoding with Generic GPU" IEEE Transactions on Circuits and Systems for Video Technology. IEEE Service Center, Piscataway, NJ US. vol. 15, No. 5, May 1, 2005, pp. 685-693, p. 686, right-hand column, last papagraph, pp. 687-688, section III, pp. 688-689, section IV.A, pp. 689-690, section IV-C, p. 690, right hand column, second pargraph * figures 2, 5*.

Search Report dated Jul. 10, 2009.

\* cited by examiner a)

$\ldots, i, j, \text{Coeff}_{i,j}, \quad i, j+3, \text{Coeff}_{i,j+3}, \ldots$ b)

a)

b)

c)

METHOD FOR VIDEO DECODING SUPPORTED BY GRAPHICS PROCESSING UNIT

This application claims the benefit, under 35 U.S.C. §119 of EP Patent Application 08305871.9, filed Nov. 28, 2008.

FIELD OF THE INVENTION

This invention relates to a method for providing Graphics Processing Unit (GPU) support to a CPU in order to perform optimized video decoding.

BACKGROUND

Today, at least two different general approaches are employed for implementing processing units: the general purpose central processing unit (CPU) and the special purpose graphics processing unit (GPU). GPUs are specialized for calculating 3-dimensional (3D) scenes to be mapped to 2-dimensional (2D) scenes for being displayed, and have parallel architectures that enable them of highly parallel processing. GPUs have therefore high processing power. However, most of the common programming applications are optimized for sequential processing on CPUs.

Utilizing GPUs to accelerate video encoding and decoding is therefore desirable. Traditionally, in order to benefit from the powerful GPU, computation tasks (such as image or video processing etc.) would have to be re-formulated to be a 3D rendering task, so that their data are organized as graphics data, and a graphics API (Application Programming Interface) would be used. This makes GPGPU (General-Purpose computation on GPU) difficult and programs complicated.

In order to ease and improve the GPGPU realization, NVIDIA Corp. released "Compute Unified Device Architecture" (CUDA) for the GeForce 8800 Series GPU and beyond. CUDA is a hardware and software architecture for issuing and managing computations on the GPU as a data-parallel computing device without mapping them to a graphics API. CUDA also improves the memory access efficiency.

Generally, each sequentially operated program, and each sequentially operated branch of a parallel program, is a so-called thread. Threads operate rather autonomously on their individual input data and provide output data. Input data are read from a buffer, and output data are written to a buffer. GPUs have two basic types of memories or buffers: texture storage on GPUs is usually different from other memory types, in order to enable more efficient access. In the terminology of CUDA, which is used herein, these are so-called global memory and texture memory. Global memory provides read and write access to all threads but is rather slow, while texture memory provides read-only access to threads but is fast. Data from the global memory can be copied into the texture memory. This structure is optimized for typical GPU tasks, such as texture mapping. Texture is a 2D pattern that is mapped to the surface of 3D objects.

CUDA provides multiple multi-processors to do the same computation task on different data units simultaneously. It also provides general DRAM memory addressing methods, giving programmers flexibility to read and write data at any location in DRAM. Furthermore, it features a parallel data cache (on-chip shared memory) with very fast general read and write access, to support efficient data sharing. However, the DRAM and the cache are very limited in size and not sufficient for many tasks. Moreover, shared memory can't be accessed by host functions, i.e. functions running on a CPU when a GPU works as a co-processor of a CPU. In this case, program and data would have to be managed by the CPU first before the control goes to GPU.

GPUs may operate on multiple data layers in parallel. Usually, the GPU has four data layers, which are normally used for YRGB data per pixel. E.g. the four 8-bit elements of an input pixel can be stored as a 4D input vector and then processed independently and simultaneously.

Videos are often encoded according to the MPEG-2 standard, which comprises segmenting a picture into macroblocks (MB), and sequentially processing lines of MBs. The respective decoding process is depicted in FIG. 1 and comprises mainly variable-length decoding 101, inverse scan 102, inverse quantization 103, inverse discrete cosine transform (iDCT) 104 and motion compensation (MC) 105. Motion compensation uses previously decoded pictures as reference. These were therefore stored in a frame memory 106. Finally, the decoded samples of the picture are output to a display.

One problem is how to map a complex, sequential task such as video decoding to a combined CPU-GPU hardware platform, and particularly a CUDA enabled platform with the above-described memory structure. While e.g. WO2004/095708 provides a general approach, it is still difficult to assign the different modules of such complex process to different hardware processing units (CPU and GPU) such that an optimized balance of the CPU and GPU workloads is achieved. Ideally, time costs should be almost equal between CPU and GPU, i.e. neither CPU nor GPU should have to wait for results from the other units.

SUMMARY OF THE INVENTION

The invention solves at least the above-mentioned problems. The present invention provides a video decoding system that can be implemented on a CPU and GPU platform, wherein the single decoding sub-tasks are structured such that both the sequential processing capabilities of the CPU and the parallel processing capabilities and the memory structure of the GPU are utilized in an optimized manner. Advantageously, in performing the invention the processing load on both CPU and GPU is almost equal.

According to one aspect of the invention, a method for decoding encoded video data on a hardware architecture that comprises a main processing unit (CPU) and a Graphics Processing Unit (GPU), wherein the Graphics Processing Unit has a first buffer (texture buffer) and a second buffer (global buffer), comprises steps of decoding on the main processing unit headers and macroblocks of the encoded video, wherein decoded picture data are obtained, optionally performing inverse quantization on the decoded picture data (this step is optional here since it may also be performed later, on the GPU), transferring the decoded picture data or the inverse quantized picture data to the GPU, where it is stored in the first (global) buffer of the GPU, and then on the GPU performing the steps of inverse quantizing the transferred data (if this has not been performed on the main processing unit before), waveform transforming the inverse quantized data, e.g. performing inverse DCT, performing motion compensation, wherein reconstructed picture data are obtained, buffering the reconstructed picture data in the first (global) buffer of the GPU, determining if the decoded picture data are used as reference for decoding at least one further picture, and if the decoded picture data are used as reference for decoding at least one further picture, then copying the decoded picture data from the first (global) buffer to the second (texture) buffer, and transferring the reconstructed picture data from the first or second buffer towards a display.

One embodiment of the invention concerns software that is suitable for making a computer perform said method, and in particular a computer that comprises one or more CPUs and one or more GPUs that cooperate in performing the method.

The disclosed solution comprises several special issues relevant for implementation, including module assignment to CPU/GPU, picture storage determination, and the storage determination for residual pictures. Residual pictures may be formatted as waveform transform results.

The picture data comprise luminance and chrominance components (YUV) in one of a plurality of color space formats (such as 4:4:4, 4:2:2, 4:2:0). Further, GPUs may typically operate in parallel on at least two data layers (usually four, as described above). In one embodiment of the invention, the color space format of the encoded picture data is determined, and according to the determined color space format, for a first color space format (4:4:4) luminance data (Y) and chrominance data (U,V) are processed together in a single data layer, and for at least one other color space format (4:2:2, 4:2:0) luminance data (Y) are processed in a separate first data layer while chrominance data (U,V) are processed together in a separate second data layer. In one embodiment, the above color space format dependent storage and processing is used only for non-residual pictures, while for residual pictures each of the three components is stored and processed in a single separate layer.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a simplified conventional MPEG-2 video decoding procedure.

DETAILED DESCRIPTION OF THE INVENTION

Figure 2:
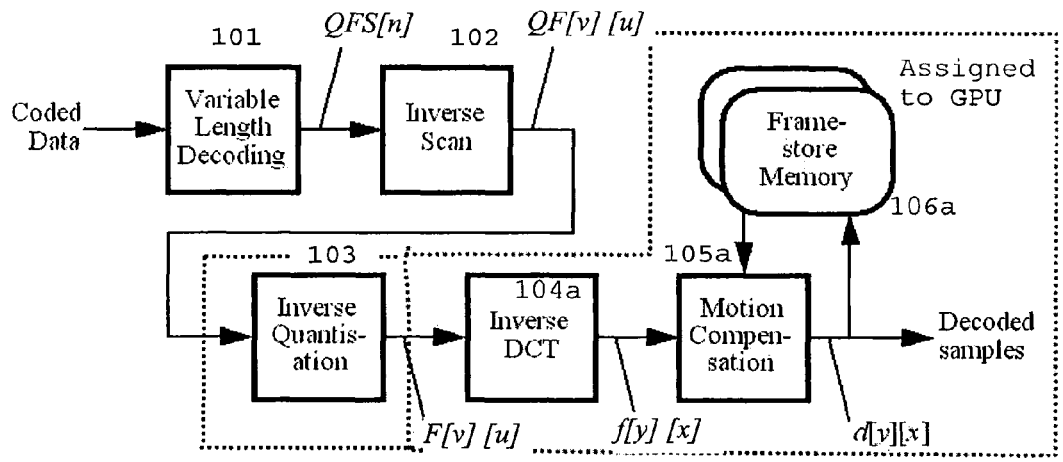
FIG. 2 module assignment in a CUDA-based video decoder.

FIG. 2 shows a basic module assignment in a CUDA-based video decoder according to one aspect of the invention. Variable-length decoding 101 and inverse scan 102 are performed on a CPU. Inverse quantization 103 can be performed either on the CPU or on the GPU. Inverse discrete cosine transform (iDCT) 104a and motion compensation (MC) 105a are assigned to the GPU. This is particularly advantageous since they are compute-intensive tasks. Previously decoded reference pictures required for motion compensation are stored in a frame memory 106a within the GPU. Finally, the decoded samples d[y][x] of the picture are output to a display. Note that "frame" stands herein for a picture which can be interlaced or progressive at a specific moment.

Figure 1:
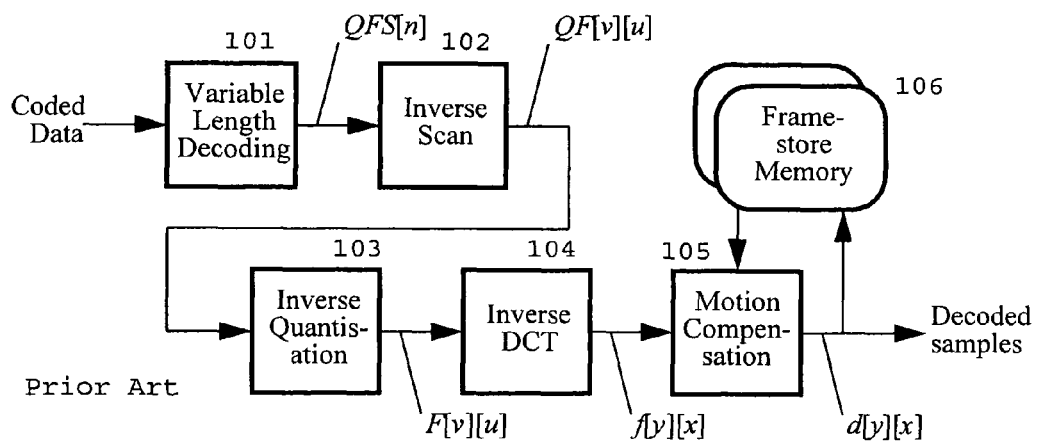

Following issues are solved by the decoder framework according to the invention:

1. Assigning the different processing steps (i.e. modules) in a decoding procedure as shown in FIG. 1 to CPU or GPU. The assignment minimizes the data communication between CPU and GPU, balances the workload of CPU and GPU to maximize the CPU-GPU pipeline effect, and ensures that the assigned modules fit for efficient CUDA realization.

2. Determining where to store picture data, and where to store the residual pictures (i.e. waveform transform results). The invention minimizes access efforts and achieves accurate sampling.

In the following a system flowchart will be described, and then several key aspects will be further explained.

System Flowchart

Figure 3:
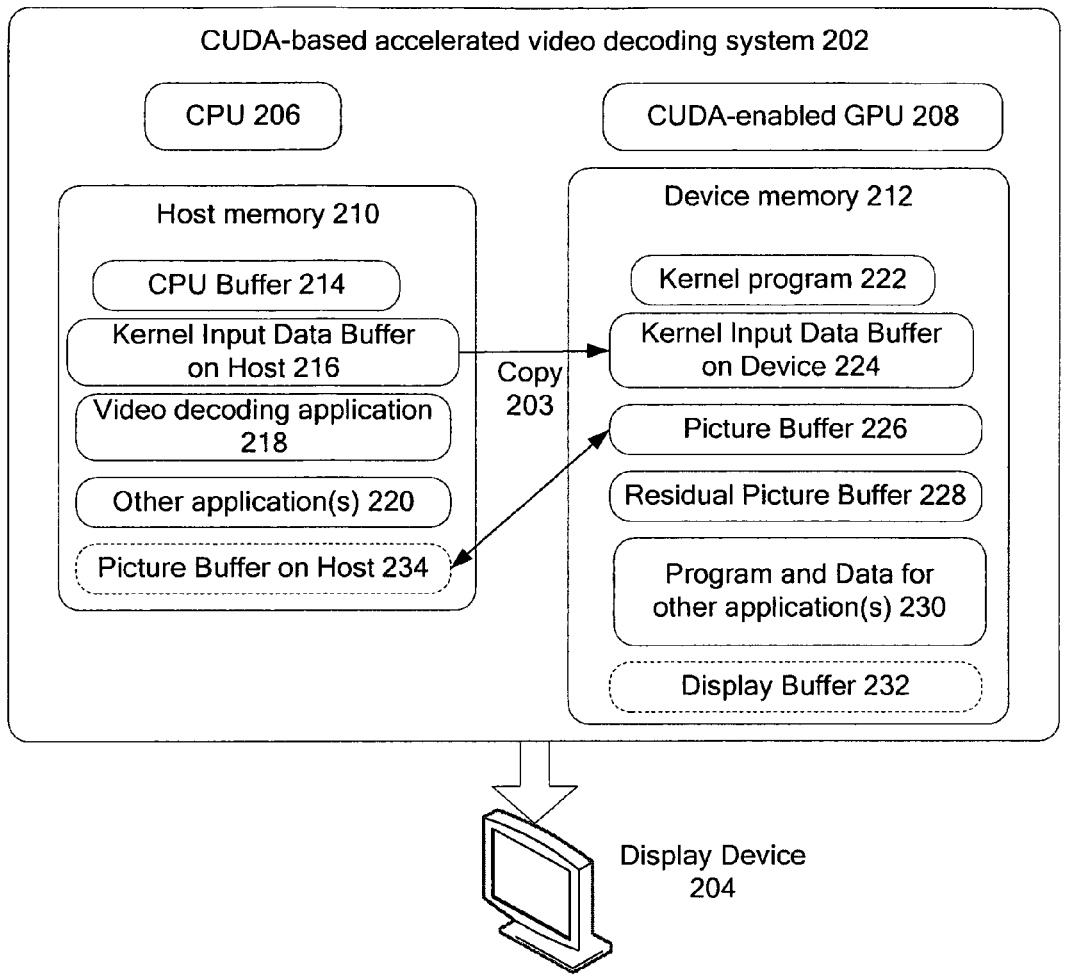
FIG. 3 an exemplary architecture of a CUDA-based video decoding system.

FIG. 3 illustrates an exemplary architecture of a CUDA-based accelerated video decoding system 202. It receives an encoded video bitstream, decodes the received data, and transmits the decoded data to display device 204 (TV, computer monitor, or other such display device). Note that the video decoding system 202 may also be implemented as an integrated component of the display device 204, or vice versa.

The video decoding system 202 may be implemented within a personal computer, video game console, or other such device configured to receive, decode and render video data. It includes a central processing unit CPU 206, a CUDA-enabled graphics processing unit GPU 208, host memory 210 for storing programs and data for CPU, and device memory 212 for storing programs and data for GPU. Host memory 210 and CPU 206 may be integrated together in one device (e.g. chip, board, etc.), and device memory 212 and GPU 208 may also be integrated together, which is the usual case.

Host memory 210 has: CPU buffer 214 for the data required by CPU programs and accessible by CPU; kernel input data buffer on host 216, which stores the data collected by CPU programs and required by CUDA kernel execution on GPU; video decoding application 218, which are the decoding programs running on CPU; one or more other applications 220 can also reside in host memory. Note that a picture buffer on host 234 is an optional block in host memory, containing a copy of the device picture buffer 226.

Device memory 212 has: Kernel program 222, which are the decoding programs running on GPU; kernel input data buffer on device 224 (device buffer), which is the GPU copy 203 of kernel input data buffer on host 216; picture buffer 226, which stores decoded pictures including reference pictures; residual picture buffer 228, which stores the decoded residual picture data (i.e waveform transform results). Programs and data for other applications 230 may also reside in device memory. Note that a display buffer 232 for storing pictures for display purpose is an optional module. Alternatively, the picture buffer 226 may act as a display buffer.

Figure 4:
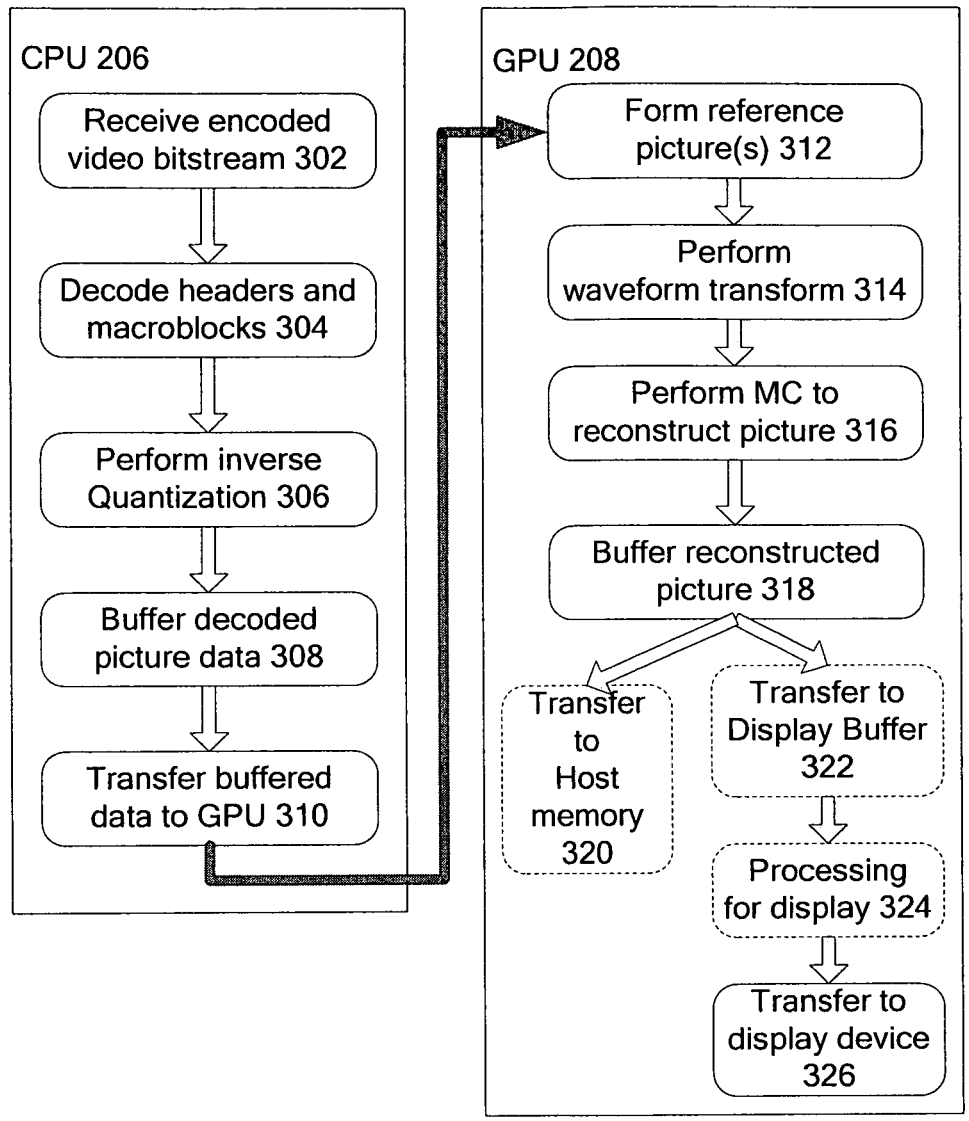
FIG. 4 an exemplary video decoding procedure utilizing the CUDA-based video decoding system.

FIG. 4 illustrates the overall procedure of decoding on the CUDA-based accelerated video decoding procedure system 202. Blocks 302-310 represent processing performed by CPU 206, while blocks 312-326 represent processing performed by GPU 208.

At block 302, video decoding system 202 receives an encoded video bitstream. The described implementation applies exemplarily to video bitstreams encoded according to MPEG-2 progressive video format. Alternate implementations may be configured to decode video bitstreams encoded according to other formats, such as MPEG-2 interlaced, MPEG-4 and H.26x. At block 304, the common decoding steps are processed such as decoding various headers, performing variable length decoding for all MBs of a picture etc. At block 306, inverse quantization is performed on waveform transform coefficients obtained from variable length decoding of MBs. At block 308, the decoded picture data are buffered. These data are required for kernel execution on GPU. They reside in the (CPU-related) host buffer 216, and are then copied 203 to the (GPU-related) device buffer 224. Such data for each picture unit (usually MB or block) may comprise position data or coordinates, inverse quantized waveform transform coefficients, motion vectors and some flags affecting the program execution on GPU. Block 310 copies buffered data from host buffer 216 to device buffer 224.

At block 312, reference pictures are formed based on some reconstructed pictures. In one optimized implementation, the reconstructed pictures are stored in global memory of CUDA, and are directly used as reference pictures. In another optimized implementation, the reconstructed pictures are in global memory while reference pictures are in texture memory, and data from global memory are copied to texture memory inside block 312. Further details on determining where to store pictures are given below.

At block 314, waveform transform (e.g. inverse DCT) is performed as a CUDA kernel on GPU, to obtain residual picture data from some data collected during CPU decoding procedure. More details of this block are described below.

At block 316, motion compensation (MC) is performed as one or several CUDA kernels on GPU, to reconstruct the picture by adding up residual picture data and reference picture data. More details of this block are described below.

At block 318, reconstructed pictures may be buffered for optional further processing, such as optional transferring back to host memory 320, optional transferring to display buffer 322, and optional display-oriented processing 324 (such as color space conversion, special effect creation, etc.). Finally, the pictures are sent to a display device at block 326.

Figure 5:
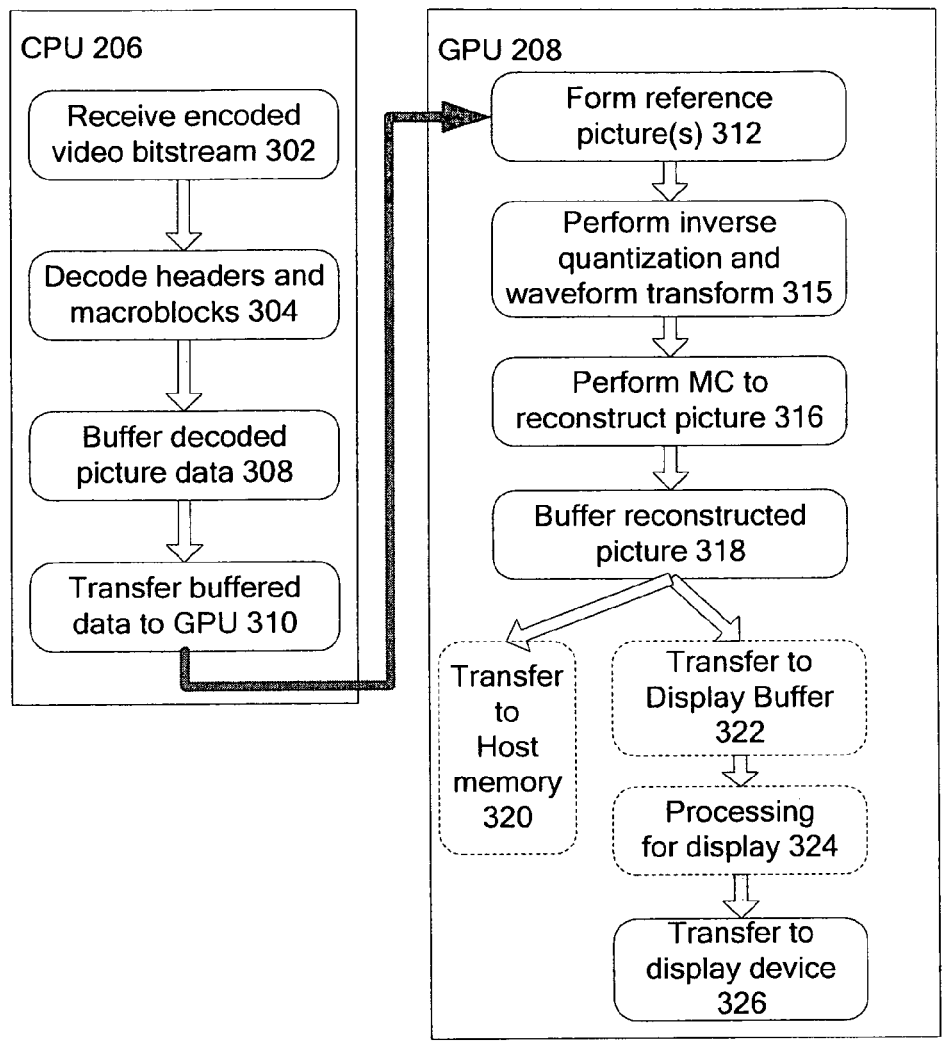
FIG. 5 another exemplary video decoding procedure utilizing the CUDA-based video decoding system.
Figure 6:
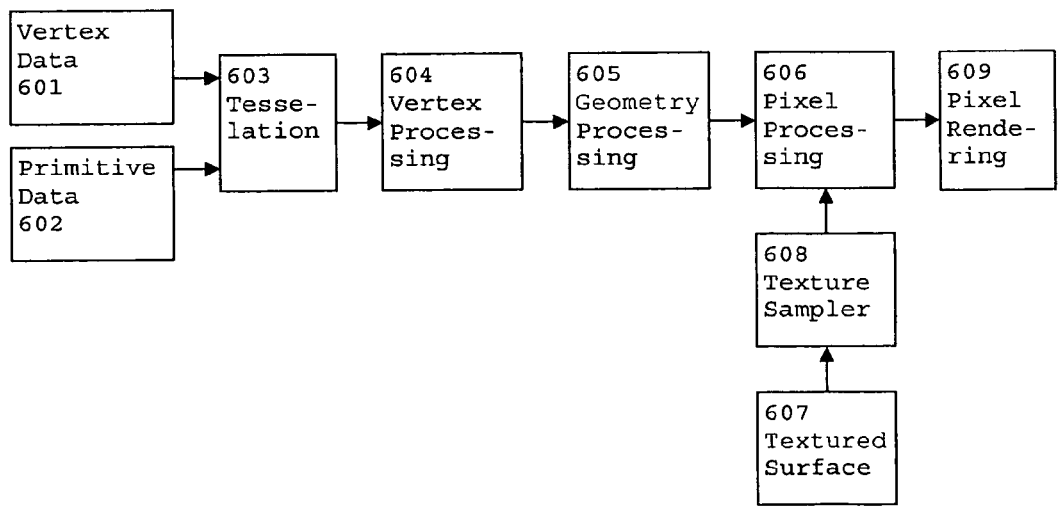
FIG. 6 the GPU graphics pipeline.

FIG. 5 illustrates another variant of an overall procedure for decoding on the CUDA-based GPU-accelerated video decoding system 202. In this embodiment, also the inverse quantization is off-loaded to the GPU, where it may be performed in a block 315 together with the waveform transform. Therefore the inverse quantization block 306 from FIG. 4 is skipped in FIG. 5.

In the following, several key ideas of the invention are further explained.

Module Assignment to CPU/GPU

Figure 7:
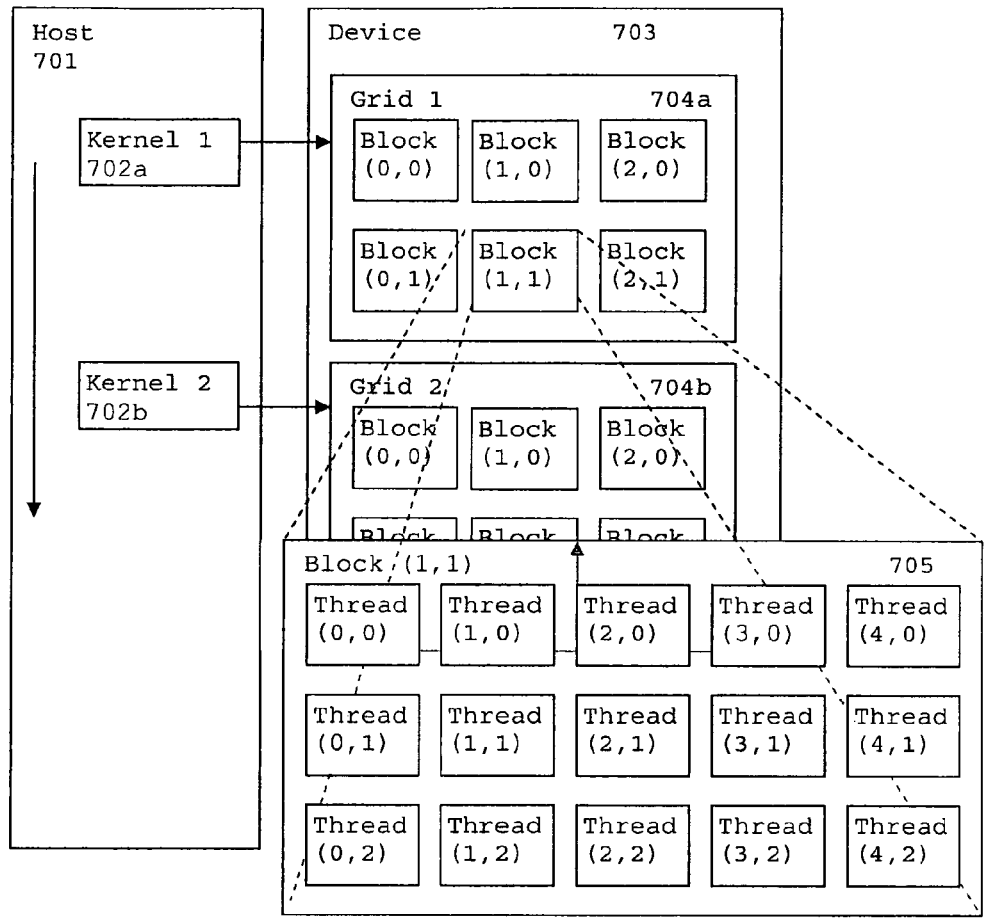
FIG. 7 the structure of thread batching in CUDA.

From a programming perspective, a CUDA-enabled GPU (termed as device herein) is a compute device capable of executing a very high number of threads in parallel. It operates as a coprocessor to a main CPU (termed as host), running the data-parallel, compute-intensive portions of applications. Such a portion (termed as kernel) is downloaded to the device and executed as many different threads on GPU. The batch of threads from one kernel is organized as a grid of thread blocks. First, a thread block is formed by multiple threads that can cooperate together by efficiently sharing data through some shared memory and synchronizing their execution to coordinate memory access. Each thread inside a thread block is identified by its thread ID, which may be a 2- or 3-component array index. Second, multiple thread blocks can be batched together into a grid of blocks, where each block is identified by a 2-component array index (its block ID). The thread batching organization is shown in FIG. 7. If the input and output data are organized well, the threads can access individually different data portions based on block ID and thread ID, thus the parallel execution on different data can be achieved.

Waveform transforms such as DCT, Inverse DCT, etc. are data-parallel, compute-intensive modules, thus proper for CUDA realization. Motion compensation is also assigned to GPU, in order to minimize CPU-GPU data communication. Therefore frame-store memory for all pictures is allocated and maintained on GPU. Finally, the basic module assignment result is shown in FIG. 2. This assignment achieves a good balance of CPU-GPU workload (almost equal time costs). The data communication is very low. In one embodiment, only non-zero waveform coefficients (e.g. DCT coefficients), motion vectors and block addresses are transmitted from CPU to GPU.

Variations of this basis assignment are possible. In one embodiment, the inverse quantisation may be changed to run on GPU, thereby slightly adjusting the CPU-GPU workload. In one embodiment, the decoded samples or pictures may be transmitted from GPU to CPU, e.g. for applications such as post-processing on CPU.

The proposed assignment of the different modules to different hardware platforms (CPU or GPU) has at least the following advantages:
1. The data communication between CPU and GPU is minimized.
2. The workload of CPU and GPU is balanced.
3. The modules off-loaded onto GPU can be efficiently realized with CUDA, i.e. they are data-parallel, compute-intensive modules.

Determining the Storage for Pictures

At least two issues must be decided for the picture storage on GPU: How to determine the memory space for storage, and how to determine the data packing format for Y,U,V components.

Concerning the first issue, the GPU memory accessed by CUDA may be allocated at different spaces such as registers, local memory, shared memory, global memory, constant memory and texture memory. They are quite different in total available size, access permission (read-only/read-write), latency, access limitations (e.g. accessible from CPU or GPU), synchronization support etc. The preferred solution is to use the global memory, which supports read-write operations in threads and can handle the huge amount of picture data, rather than using texture memory, which is read-only for threads. Therefore, this enables threads to perform both read and write operations. However, using the global memory has two short-comings: first, a read operation of global memory data is much slower than that of texture data, and second, interpolation calculation would have to be explicitly managed in the thread for sampling the reference picture. This is complex and inefficient, and may be automatically processed if texture memory is used.

This aspect of the invention is based on the recognition of the fact that the motion compensation module performs only a read operation when a picture is used as a reference for decoding a new picture, while a write operation is only required when the picture is being decoded. That is, when decoding a picture, the data of a particular picture are accessed by only one operation, namely either a read operation (when it is used as a reference picture), or a write operation (when it is the resulting picture that is being decoded). Thus, one aspect of the invention is to use the global memory for storing the decoded picture, copying the decoded data to the texture memory before decoding a new picture (if it will be used as a reference picture), and accessing the reference image from the texture memory.

In one embodiment, all pictures may be copied to the texture memory, while another embodiment comprises the step of determining whether a decoded picture will be used as a reference picture, and copying it to the texture memory only if it will be used as a reference. Depending on the video encoding, pictures that serve as reference pictures for decoding may be marked, e.g. by a flag, or a list of reference pictures may be received. Note that the operation of writing to texture memory is allowed in host functions. "host function" is a function launched by the CPU, but the effect may be on GPU, e.g. copying data from global memory to texture memory, or from texture memory to global memory. In CUDA terminology, which is employed herein, "host" means CPU and "device" means GPU. Other host functions relating to GPU are e.g. CPU-GPU data communication, GPU-GPU data communication, kernel launching or GPU capability query. "kernel" is a function being executed on GPU. However, CPU performs "kernel launching", wherein the code is copied to GPU, and the GPU resources are prepared for the kernel execution.

Such a scheme solves the above-mentioned two shortcomings of global memory access (read operations being slower, and inefficiency if interpolation calculation is managed in the thread for sampling the reference picture). The additional cost of data copying from global memory to texture memory is negligible.

Concerning the second issue, i.e. how to determine the data packing format for Y,U,V components of a MB, the proposed solution is adaptive, depending on the used chroma format. GPUs usually operate on vertices; a vertex is an edge of a polygon. Each vertex has not only a position in x,y,z coordinate system, but also three texture coordinates u,v,w for mapping textures to the vertex. Therefore, the GPU architecture provides separate so-called channels or planes for u, v and w texture coordinates. Note that texture coordinates u,v,w of a vertex must be distinguished from luma/chroma components YUV of a picture.

Figure 8:
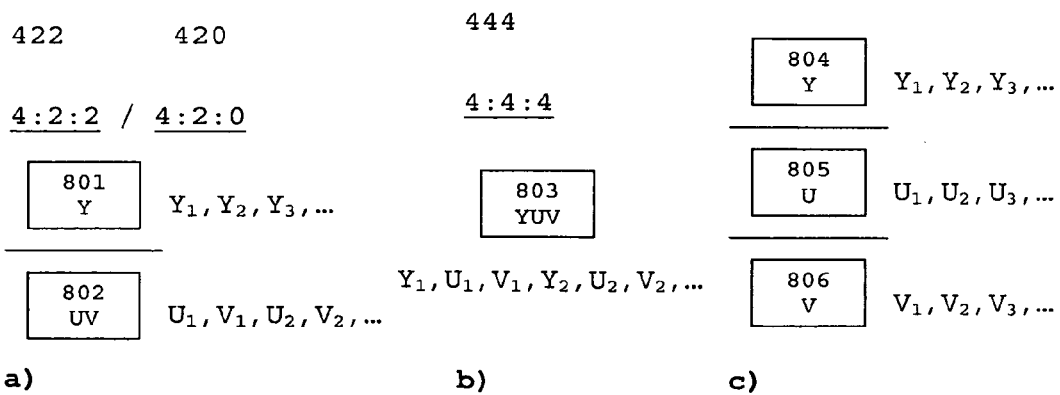
FIG. 8 usage of different data planes according to the color space format.

According to one aspect of the invention, shown in FIG. 8, the YUV components of a MB are stored and processed either in different architectural planes 801,802 or grouped into a single 3-component plane 803, depending on the employed chroma format. The single-plane scheme makes the implementation clear and simple, while the 3-plane scheme is more efficient, since three components can be retrieved through a single memory access. However, for the commonly used chroma formats (4:2:0 and 4:2:2), U,V data need be up-sampled to reach the same resolution as Y data, which is an additional processing step. This results in an accuracy sacrifice in texture fetching (sampling) operation.

To optimize both, efficiency and accuracy, the two-plane data packing format 801,802 is employed for 4:2:0 and 4:2:2 color space formats 420,422, as shown in FIG. 8 *a*). More specifically, Y data is organized as a 1-component plane 801, while U and V data are packed into a 2-component plane 802. For 4:4:4 chroma format 444, the 3-component scheme 803 is adopted, as shown in FIG. 8 *b*).

Determine the Storage for Residual Pictures

Similar to picture storage as described above, two similar issues arise concerning how to determine the storage of residual pictures (i.e. the respective waveform transform results). A residual picture is the remainder of a prediction based on at least one reference picture, i.e. it is in principle a prediction error. On the receiving end, the reference picture(s) must be added to the residual in order to obtain a reconstructed picture.

Concerning the first issue, i.e. how to determine which memory space to be used for storage of residual pictures, the situation and analysis are similar to the non-residual picture case. There are two choices: either store the waveform transform results (WTR) only in global memory and read them from there, or store the WTR first in global memory inside the waveform transform module, then copy the WTR to texture memory, and then read the WTR from texture memory into the motion compensation module (the motion compensation performs the addition of reference picture data and WTR). According to one aspect of the invention, the first scheme is selected. This has the advantage that the additional cost of data copying from global memory to texture memory, though low, can be saved. Differences from the above-described non-residual picture case exist: First, no interpolation operation is required when sampling WTRs. Second, it has been found that the bottleneck of the motion compensation module is the picture data write operation, not the reading of WTRs. Thus, it is beneficial to store the WTRs in the global memory, and not copy them to the texture memory.

Concerning the issue of determining the data packing format for Y,U,V components of residuals, the input data of the waveform transform are independent for these components. In one embodiment, three 1-component planes are selected as packing format for residual pictures, see FIG. 8 *c*).

One particular advantage of the invention is that it is very efficient, while at the same time providing a high level of accuracy.

Waveform Transform (WT)

In the following, more details on the waveform transform block are described. Waveform transforms are important and widely used transforms in digital video processing. They are key components for a variety of image and video coding standards such as JPEG, JPEG2000, MPEG-1, -2, -4, H.261, H.263, H.264, etc. Although numerous waveform transforms exist, they use very similar computation formulas. While in this disclosure only DCT (Discrete Cosine Transform, also called "forward DCT") and inverse DCT (iDCT) will be exemplarily described, the same discussion may in principle be applied to other waveform transforms.

DCT is employed in an encoder. It transforms a group of picture pixels to coefficients; the number of coefficients is the same as the number of input data. Then inverse DCT is employed in a decoder for transforming the coefficients back to pixel values. The most common case is that DCT/iDCT is applied to transform/reconstruct 8*8 pixel 2-D picture data, where the DCT formula is:

$$F(u, v) = \frac{C(u)}{2} \cdot \frac{C(v)}{2} \sum_{x=0}^{7} \sum_{y=0}^{7} f(x, y) \cos\frac{(2x+1)u\pi}{16} \cos\frac{(2y+1)v\pi}{16} \quad (1)$$

where:

the 8*8 picture data are f(x,y):x=0, . . . , 7 and y=0, . . . , 7 the 8*8 DCT coefficients are F(u,v):u=0, . . . , 7 and v=0, . . . , 7

$$C(n) = \begin{cases} 1/\sqrt{2}, & n = 0 \\ 1, & n \neq 0 \end{cases}$$

are constants.

The inverse DCT formula is:

$$f(x, y) = \frac{1}{4}\left[\sum_{u=0}^{7}\sum_{v=0}^{7} C(u)C(v)F(u, v)\cos\frac{(2x+1)u\pi}{16}\cos\frac{(2y+1)v\pi}{16}\right] \quad (2)$$

Both transforms (DCT and iDCT) may be represented in matrix multiplication with the same form. We use the iDCT as an example:

$$\text{Pict}=B*\text{Coeff}*B^T \quad (3)$$

All matrices are 8*8 dimensional, and their elements are:

$$Coeff_{i,j} = F(i, j),$$

$$Pict_{i,j} = f(i, j),$$

$$\text{and } B_{i,j} = const(j) * \cos\frac{(2i+1)j\pi}{16},$$

$$\text{where } const(j) = \begin{cases} 1/\sqrt{8}, & j=0 \\ 0.5, & j \neq 0 \end{cases}.$$

Let $B=[b_0 \; b_1 \ldots b_7]$, we get an equivalent matrix representation:

$$Pict = \sum_{i,j} Coeff_{i,j} b_j b_i^T \quad (4)$$

Or, let $M_{i,j}=b_j b_i^T$, we have $$Pict = \sum_{i,j} Coeff_{i,j} M_{i,j} \quad (5)$$

Because DCT and iDCT are so important, there are varieties of software/hardware implementations on different platforms. Existing GPU based realizations) are based on eq. 3 or on the JPEG ANN fast algorithm. Both types can achieve comparable performance to the optimized CPU implementation, and the first[1] has higher performance due to regular memory access than the second. Another proposal[2] is a GPU implementation based on eq. 5, resulting as an efficient GPU solution. However, it still has some short-coming: all $M_{i,j}$ matrices, totally 64*64 float values, have been stored for the calculation. This is a waste of memory space, and therefore this approach is inefficient.

[1] Fang B., Shen G., Li S., Chen H.: Techniques for efficient DCT/iDCT implementation on generic GPU. In: Proceedings of IEEE International Symposium on Circuit and Systems (2005), pp. 1126-1129
[2] Bo Han, Bingfeng Zhou, Efficient Video Decoding on GPUs by Point Based Rendering, In HWWS '06, Proceedings of the ACM SIGGRAPH/Euro-graphics conference on Graphics Hardware (Vienna, 2006)

According to one aspect of the invention, a waveform transform (using iDCT as an example for the following description) runs on GPU as CUDA kernel(s). Some CUDA concepts such as kernel, thread, thread block, and grid were described above.

In the system 202 of FIG. 3, the following blocks are related to the iDCT task: kernel input data buffer on host 216, video decoding application 218, kernel program 222, kernel input data buffer on device 224 and residual picture buffer 228.

The kernel program 222 includes all kernels. Multiple waveform transform kernels may be used for different data block resolutions and different constant matrices (i.e. matrix B in eq. 3). E.g. for an 8×8 iDCT, using one kernel kernel_iDCT_8×8 is enough. A CUDA-based iDCT kernel is executed as multiple threads. The thread batching is as follows: one thread processes all data elements on one row, and one thread block processes a fixed number (typ. 16 or 8, recorded as RESIDUAL_BLOCK_BASE_NUM) of 8×8 data blocks. Thread ID is a 2-dimensional index, one value for vertical position inside the data block and the other for different data blocks. Block ID is 1-dimensional, increasing by one for every RESIDUAL_BLOCK_BASE_NUM data block. Note that this scheme requires the total number of data blocks to be an integer multiple of RESIDUAL_BLOCK_BASE_NUM. To solve this issue, "fake" data blocks (e.g. empty data blocks) are inserted, as explained below.

The iDCT execution on GPU requires some input data, which are stored in the kernel input data buffers 216 and 224 of FIG. 3. Though it is possible to store all coefficients (i.e. all data in the matrix Coeff in eq. 3), this scheme wastes much memory and CPU/GPU communication bandwidth when most coefficients are zero. According to one aspect of the invention, a better scheme is to store only non-zero coefficients. In one embodiment, the non-zero coefficient values and their coordinates (i.e. the location of this coefficient in the matrix Coeff in eq. 3) are stored. This scheme is more efficient both in terms of memory usage and bandwidth.

When only non-zero data are stored, the required memory size of each data block is variable, because the number of non-zero coefficients is different for different data blocks. In an embodiment shown in FIG. 9, the coefficient data are stored into two data structures (e.g. memory areas) in order to make the memory size uniform: a first common data structure 904,904a is a huge 1-dimensional (1D) texture for all non-zero coefficients in a picture, including both value and coordinates. A second data structure 902,902a is a uniform-size data set for each data block, including the starting address in the 1D texture and the total number of non-zero coefficients.

Figure 9:
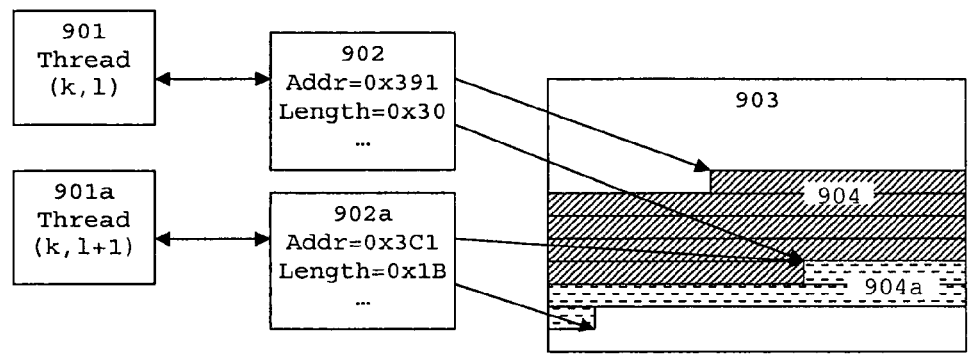
FIG. 9 a data structure for coefficient data of threads.

A first thread 901 gets input data 902 that have a constant predefined size and a particular structure. The input data 902 comprise at least an address and a length value that identify a particular data range 904 in the 1D texture memory 903. A second thread 901a gets different input data 902a of same size and structure, but the address and length value identify a different range 904a in the texture memory 903. The actual non-zero coefficients for processing and their matrix coordinates can be retrieved from the texture memory 903. FIG. 9 b) shows exemplarily how coefficients and their coordinates may be formatted within the 1D data structure 904,904a. As can be seen, e.g. coefficients i,j+1 and i,j+2 are zero and therefore not stored. The number of bits for the coordinates (e.g. 3 bit each) results from the matrix size. This aspect of the invention has the advantage that the thread input data of all residual picture blocks have uniform storage space, so that they can be easily accessed in the kernel.

Figure 10:
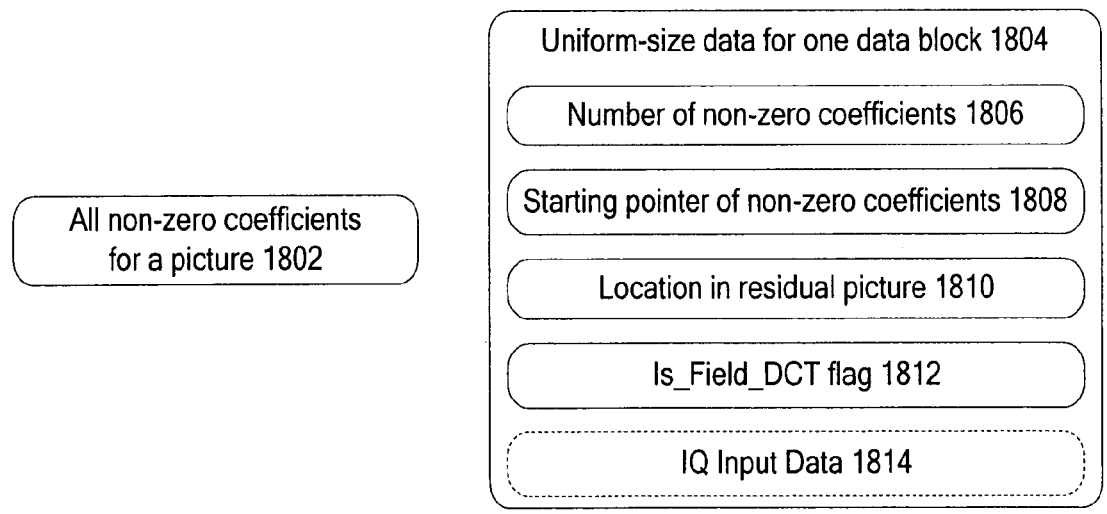
FIG. 10 input data structure for an IQ and iDCT kernel.

In one embodiment, the iDCT input data include the data elements shown in FIG. 10. These are a first block 1802 of individual size, which stores all non-zero coefficients (including both values and coordinates) for a picture, and a second block 1804 of uniform size which stores the input data for each thread, corresponding to block 902,902a of FIG. 9. In block 1802, corresponding to data structure 904, 904a of FIG. 9, the coefficients from one data block and their coordinates are stored at continuous addresses. Individual-sized data block 1802 is one data list for the complete picture, while block 1804 has independent data for each data block. Note that block 1802 is allocated as CUDA texture on GPU.

In one embodiment, block 1804 comprises at least the following data elements: the total number of non-zero coefficients in one data block 1806, the start address of non-zero coefficients in the complete list 1808, the target location of the data block in the residual picture 1810 (i.e. where to write the iDCT result), and a one-bit flag 1812 indicating the DCT type (i.e. frame DCT or field DCT). The flag 1812 affects the pitch value, i.e. the position difference between two pixels on neighboring rows with the same horizontal coordinates, in the residual picture.

When inverse quantization (IQ) is performed on GPU, there are additional input data, shown as block 1814 in FIG. 10. Block 1814 may have different data elements for different IQ operations from different video standards. For example, it may have the following elements for MPEG-2:

- a quantizer matrix index, which indicates which quantizer matrix will be used for IQ. All quantizer matrices are constant values used in IQ procedure;
- a quantizer scale factor, which is used to perform inverse quantization arithmetic on all coefficients other than intra DC value; and
- a multiplication factor used for intra DC IQ. This value may be omitted if intra DC IQ is performed on CPU.

Several values may be packed into one data element in order to save memory. At least those data that will be used as thread input data for waveform transform threads are collected in the kernel data input buffer block 216 during the decoding steps 304 on CPU. Then all data are copied 203 to block 224 on GPU, with specific CUDA API calls in block 310 of FIG. 4 or FIG. 5. In one embodiment, one or more "fake" data blocks may be created to make the total amount of data a multiple of RESIDUAL_BLOCK_BASE_NUM. The data in these fake blocks should be such that the corresponding threads do harmless operations. E.g. the destination address can be set outside the residual picture scope, and the number of non-zero coefficients set to zero.

iDCT is executed for every picture. It requires a global initialization operation, which is executed only once for the whole sequence. The initialization includes the steps of: allocating residual picture buffer, wherein residual picture data (i.e. iDCT result) are allocated in the global memory and additional memory may be allocated to deal with the above-mentioned "fake" data blocks, and preparing a constant matrix, wherein the constant matrix B in eq. 3 is prepared for iDCT calculation. It is possible to switch to another constant matrix for any other waveform transform, while the same processing steps can be directly applied. The step of preparing includes selecting an appropriate constant matrix.

Figure 11:
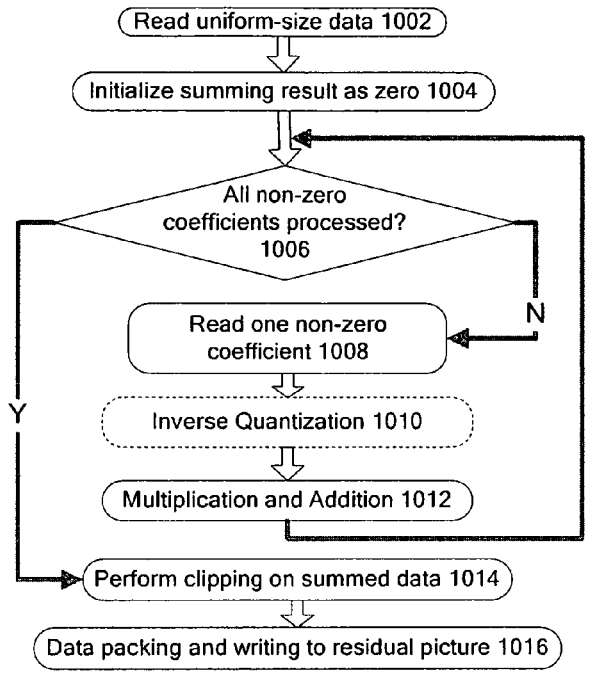
FIG. 11 exemplary processing of a waveform transform kernel.

The step of allocating residual picture buffer may also be performed in the below-described motion compensation, since the residual picture is used in both MC and iDCT. The iDCT for each picture is block 314 in FIG. 4, or block 315 in FIG. 5 when IQ is also performed. Its kernel can be further divided as the following steps shown in FIG. 11:

In block 1002, the uniform-size data are read.

In block 1004, initialization steps for iDCT calculation are performed. Since eq. 4 is used for the computation, the summation result is initialized to zero.

In blocks 1006, 1008, 1010 and 1012 the iDCT computation is performed, wherein all non-zero coefficients are processed sequentially. After reading each coefficient 1008, IQ may optionally be performed 1010. Then the coefficient value is multiplied with the proper constant coefficient of matrix B in eq. 3, and added to the summation result 1012. Finally, after all non-zero coefficients are processed, the result is clipped to a given range 1014 and output to the residual picture 1016 storage. In block 1016, the clipped values are packed before writing, as explained in the "WT Kernel design" section below.

WT Kernel Task Specification

For iDCT the kernel task is mainly to calculate picture data from coefficients, as eq. 2 indicates. However, selecting the algorithm is not trivial. In one embodiment eq. 4 is used, resulting in a faster and more efficient realization than known methods, as disclosed e.g. in US 2006/0056513 or EP1641278A2. The time cost is reduced by around 50%. Also the constant memory requirement is greatly reduced, from 64*64 to only 64 floating point values.

WT Data Organization

The required data for performing iDCT on a data block have been described above and shown in detail in FIG. 10. Features of data organization in one embodiment are to use two data structures (block 802 and 804) for non-zero coefficients, and to organize all coefficients in a CUDA texture buffer. However, in some cases, e.g. for video sequences with extremely high bit rate, it is advantageous to store all coefficients (both zero and non-zero) directly.

There are two versions of required input data, depending on whether inverse quantization (IQ) is performed on CPU or on GPU. Several values may be packed into one data element to save memory.

WT Kernel Design

As described above, some key points of kernel design in one embodiment are: Using one thread to process all data on a row in one data block, using a "fake" data block, and using packed data for writing. All reconstructed residual picture data from one thread are packed into one structure, and written to the memory with one value-assignment operation. These ideas are independent from each other (i.e. each of them can be used or not). The first idea, namely to use one thread to process all data on a row in one data block, is the most critical factor for efficiency.

In an example kernel realization, RESIDUAL_BLOCK_BASE_NUM is 8. The scheme could also be applied to perform iDCT for video sequences encoded with other standards, e.g. MPEG-1, MPEG-4, H.264, etc. The invention can in principle also be used for DCT operation that is employed in encoders, e.g. other waveform transforms with a formula similar to eq. 3 can use the algorithm. The matrix dimension in eq. 3 may be an integer other than 8.

Motion Compensation (MC)

In the following, more details on the motion compensation block are described.

Motion compensation (MC) is a fundamental module in video decoders. The encoded video data (usually organized as square blocks) contain motion vectors, which indicate the positions of similar blocks in reference pictures, and the residual picture data, which encode the subtraction of encoded block and the reference block (or interpolation results of one or more reference blocks). MC may find the reference block, perform proper sampling and average, and add with residual picture data to reconstruct the picture. MC may use residual data for picture reconstruction also when the data are intra-coded and no reference exists. In MPEG-2, the MC module for a progressive sequence is very simple: the prediction mode (i.e. the mode of utilizing reference pictures) is always frame prediction: a motion vector is assigned to a complete 16*16 macroblock for Y-component (luminance) data.

However, such a simple MC already has great practical value because progressive sequences are quite common in real applications. Furthermore, an extension to interlaced sequences is quite easy because all basic operations for MC are shared by progressive and interlaced video, such as half-pixel sampling, adding with waveform transform results (i.e. residual picture data), and writing to a decoded picture. Additionally, progressive video already include all picture coding types (intra-coded, predictive-coded and bidirectional-predictive-coded) in MPEG-2.

In performing motion compensation, following issues are analyzed and solved:

specifying the detailed sub-tasks of motion compensation as kernels. In order to optimize the efficiency, kernels perform data-parallel, compute-intensive tasks that are efficiently structured.

organizing the input and output data for kernel execution. Data can be easily accessed in CPU and GPU functions, while the data communication between CPU and GPU is minimized.

sampling the reference picture through texture fetching.

According to one aspect of the invention, MC runs as one or more CUDA kernels on GPU. In FIG. 3, the following blocks are related to MC: kernel input data buffer on host 216, video decoding application 218, kernel program 222, kernel input data buffer on device 224, picture buffer 226 and residual picture buffer 228.

Figure 12:
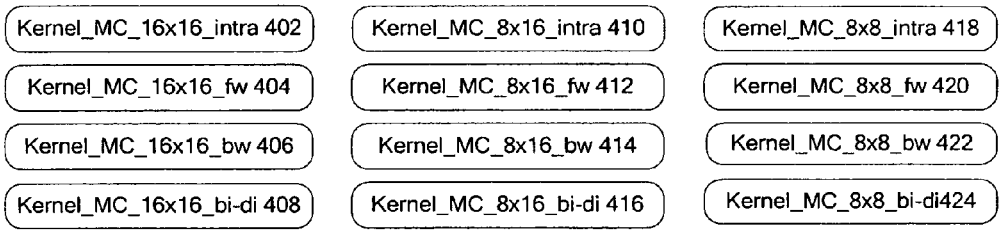
FIG. 12 different types of Motion Compensation kernels.
Figure 12:
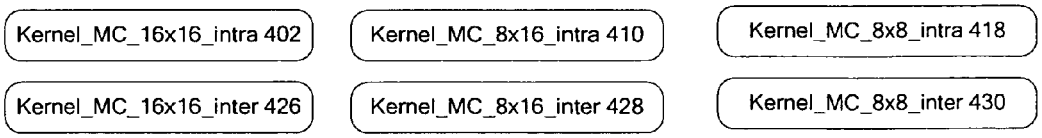
Figure 12:
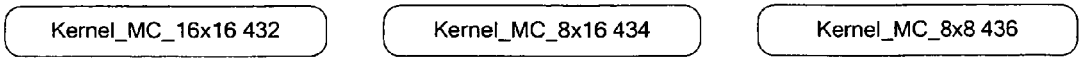

The kernel program 222 includes all kernels. FIG. 12 represents a possible implementation of all MC kernels for CUDA execution. More explanations on MC kernel definition are given below.

In FIG. 12 a), 16×16, 8×16 and 8×8 are different picture block resolutions; different cases of references are intra, forward, backward and bi-directional. Each combination of a block resolution and reference is processed in a separate kernel. FIG. 12 b) shows another MC kernel choice: The three reference cases of forward, backward, bi-directional for inter or intra prediction are merged and processed together in "xxxx_inter" kernels 426, 428,430 and "xxxx_intra" kernels 402,410,418. FIG. 12 c) shows a third choice of MC kernels, wherein all reference cases for inter and intra prediction are merged and processed in one kernel 432,434, 436. Particularly for the second and third case, larger blocks may be divided and processed as smaller blocks.

In CUDA, a MC kernel is executed as multiple threads. The kernel design depends on the employed thread batching. In one embodiment, one thread is used to process all pixels on a row in one picture block, and one thread block to process a fixed number of picture blocks (typ. 16 or 8, recorded as PICT_BLOCK_BASE_NUM).

The MC execution on GPU requires some input data, which are included in kernel input data buffer blocks 216 and 224 of FIG. 3. The MC related data elements are further explained in section "MC Data Organization". Similar as described above for waveform transform, one or more "fake" data blocks may be created to make the total number of data blocks a multiple of PICT_BLOCK_BASE_NUM.

Figure 13:
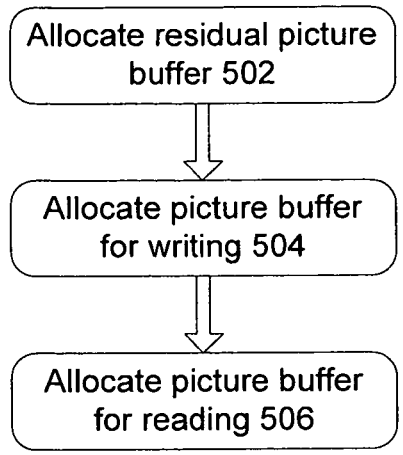
FIG. 13 a global initialization procedure for MC.

MC is executed for every picture. It requires some global initialization operation, which is executed only once for the whole sequence. The initialization includes the steps of allocating residual picture buffer 502, allocating picture buffer for writing 504 and allocating picture buffer for reading 506, as shown in FIG. 13.

In the allocating residual picture buffer block 502, residual picture data (i.e. waveform transform result) are allocated in global memory.

In the block "allocating picture buffer for writing" 504, picture data for writing (i.e. the reconstructed picture) are allocated in global memory. Additional memory is allocated to deal with "fake" picture blocks.

In the block "allocating picture buffer for reading" 506, picture data for reading (i.e. the reference picture(s)) are allocated as texture. The flags for linear filtering and data normalization are enabled. More explanations are given in section "Picture sampling through texture fetching" below.

Figure 14:
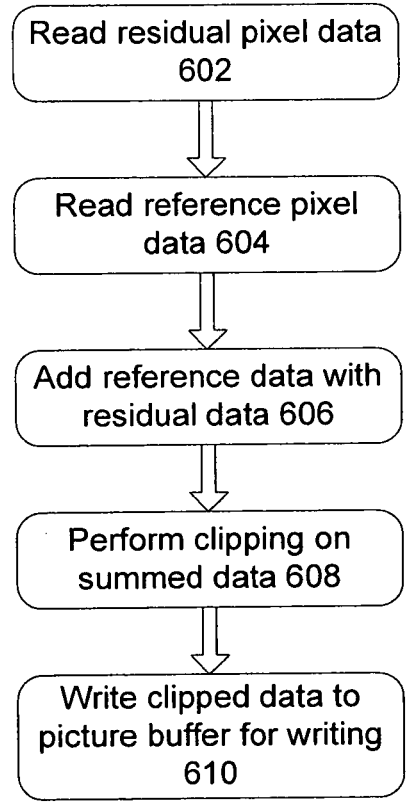
FIG. 14 the procedure of a MC kernel.

The MC for each picture is done in the MC module 316 in FIG. 4. Its kernel can be further divided according to the following steps shown in FIG. 14. Such steps are applicable to all MC kernels mentioned above.

In the read residual pixel data block 602, packed data is used for reading to reduce the number of memory access, as further explained in section "Kernel design" below.

In the read reference pixel data block 604, texture fetching is used for accessing and sampling the reference picture, as explained in section "Picture sampling through texture fetching" below. If several reference types are merged into one kernel, conditional checking is used to perform different operations for different reference types. In the add reference data with residual data block 606, the reference data is and residual data are added. If the reference type is zero reference picture (i.e. intra MB), the residual data gives the result directly. In the clipping block 608, the addition result from block 606 is clipped to the proper range. Usually the range is [0,255]. More specifically, if the value is less than 0, it is set to 0; if it is greater than 255, it is set to 255; otherwise it is unchanged. In the write clipped data to picture buffer block 610, the clipped values are packed and written to the picture buffer for writing, as explained below in section "MC Kernel design".

MC Kernel Task Specification

The basic operation for each MC kernel is: finding the reference block(s), data sampling, reading residual picture data, and performing addition, as shown in FIG. 13. Several factors make the procedure flexible. For MPEG-2 progressive sequences such factors are:

The resolution of a picture block: for Y-component it is always 16×16, while for U and V components it may be 16×16, 8×16, or 8×8, depending on the chroma format of the sequence.

The reference block(s): there are four cases such as zero reference block, one forward reference block, one backward reference block and two reference blocks (bi-directional).

The sampling position on reference: There are also four cases. Both, horizontal and vertical coordinates may lie at integer or half positions (the middle of two neighbouring integer positions).

In one embodiment, if different cases are processed in one kernel, conditional checking is performed for each thread. This is much better than if different threads went to different branches, because the parallelism is maintained.

In one embodiment, large blocks are divided into several small blocks so that their size is uniform, and a different number of kernels is used for the different resolutions. For example, 16×16 blocks may be divided and processed as four 8×8 blocks (or two 8×16 blocks), and 8×16 blocks may be divided and processed as two 8×8 blocks.

The variation in reference may be processed in one kernel or not, depending on different situations:

If the picture resolution is high and/or the bit rate is high, it is advantageous to use different kernels for different reference cases. In one embodiment, there are totally 4 kernels for 4:4:4 chroma format, corresponding to zero, one forward, one backward, and two references, respectively. For 4:2:0 and 4:2:2 formats there are 8 kernels, 4 for Y-component and 4 for UV-component data. In some pictures the utilized reference types are less than four (e.g. in intra-coded picture all picture blocks are zero-reference type). Accordingly, the executed kernels are less than the theoretic value.

If the above-mentioned condition is not satisfied, it is advantageous to merge some reference types into one kernel, and use conditional checking for branching for different types. Varieties of combination styles for reference types are possible.

MC Data Organization

The required data for motion compensation includes:

The position of the block to be motion compensated (as top-left pixel coordinate, or a constant offset from this point).

The reference type, which is a flag indicating zero, one forward, one backward, or two references.

The position of the forward reference block (may be represented by motion vector or absolute coordinate, etc.)

The position of the backward reference block (may be represented by motion vector or absolute coordinate, etc.) Some data are unnecessary if different kernels are defined for different reference types. E.g. if each reference type is processed by a dedicated kernel, reference type and un-used reference block position are not required.

When different reference types are processed in one kernel, the data for the blocks with the same reference type are packed together, minimizing the occurrences of threads that go to different branches.

Such data are collected during the variable length decoding procedure, which runs on CPU. Then all data are copied to GPU with specific CUDA API calls. Finally, kernels run on GPU in a multi-threading way: reading these data, performing MC operation, and writing compensated values to the reconstructed picture.

MC Kernel Design

The kernel design is critical for the algorithm efficiency. A simple realization would be to process the single pixels in separate threads, since the same calculations are performed on each pixel. However, this solution is very poor in performance. The main problem is that MC is memory-intensive, not compute-intensive, and therefore not exactly fit for CUDA implementation. The following measures improve the efficiency:

Use one thread to process all pixels on a row in one picture block. In one embodiment, one thread block is used to process a fixed number (typically 16 or 8, recorded as PICT_BLOCK_BASE_NUM) of picture blocks, and use a 2D index for thread ID, one value for vertical position and the other for different picture blocks.

Use packed data for reading. In one embodiment, all residual picture data required in a thread are packed into one structure, and are read with one value-assignment operation.

Use packed data for writing. In one embodiment, all motion-compensated pixels from one thread are packed into one structure, and written to the memory with one value-assignment operation.

Use additional memory to deal with "fake" picture blocks. As mentioned earlier, PICT_BLOCK_BASE_NUM picture blocks are processed in one thread block. If the total number of picture blocks is not a multiple of PICT_BLOCK_BASE_NUM, some threads corresponding to fake picture blocks will do illegal operations. A simple solution is introducing conditional checking on block ID and thread ID. However, this is not efficient. According to one aspect of the invention, a better solution is to create some "fake" picture blocks to make the total number be a multiple of PICT_BLOCK_BASE_NUM.

In these fake blocks, corresponding threads perform harmless operations. E.g. the destination address is set to outside the original picture scope, so that no relevant data are disturbed, and the reference position is the same as the block position. In this example, little additional memory can be allocated in the picture data allocation stage to contain these outside pixels.

Note that the above-mentioned measures are independent from each other, i.e. each of them can be used or not. The first (usage of one thread to process all pixels on a row in one picture block) is the most critical factor for efficiency. As a result, the performance is improved greatly.

MC Picture Sampling Through Texture Fetching

The reference pixel value is added to residual picture data during the motion compensation. This task is fulfilled by texture fetching. The target position (integer-pel or half-pel) is set to a texture coordinate, and texfetch, a CUDA API call, can be used to obtain a pixel value. Sampling (interpolation) is automatically performed if the texture coordinate indicates a half-pel position. The code is like the following:

$$INT\_TYPE\ pixel\_val=texfetch(tex\_ref\_picture, x\_coord, y\_coord)*RANGE+ROUND \qquad (6)$$

Figure 15:
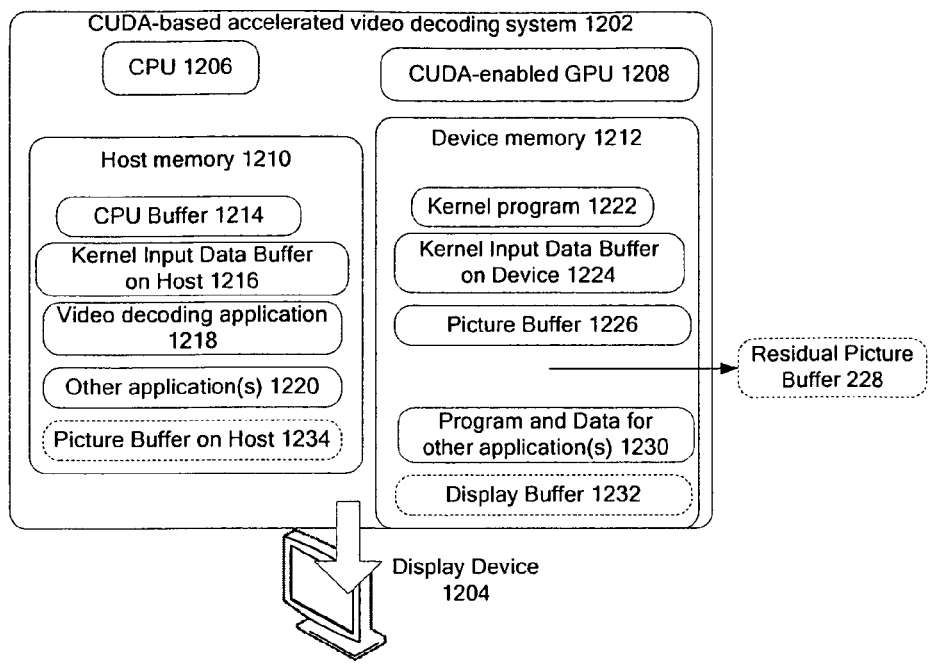
FIG. 15 an improved exemplary video decoding procedure utilizing the CUDA-based video decoding system.

FIG. 15 shows an improved exemplary video decoding procedure utilizing the CUDA-based video decoding system, similar to that shown in FIG. 3. However, the tasks from several kernels are packed into one kernel. In particular, the embodiment shown in FIG. 15 has no residual picture buffer. Instead, all GPU tasks (IQ, waveform transform, and MC) are performed together, so that advantageously no intermediate storage is necessary, and no global storage space of residual picture buffer is required.

Figure 16:
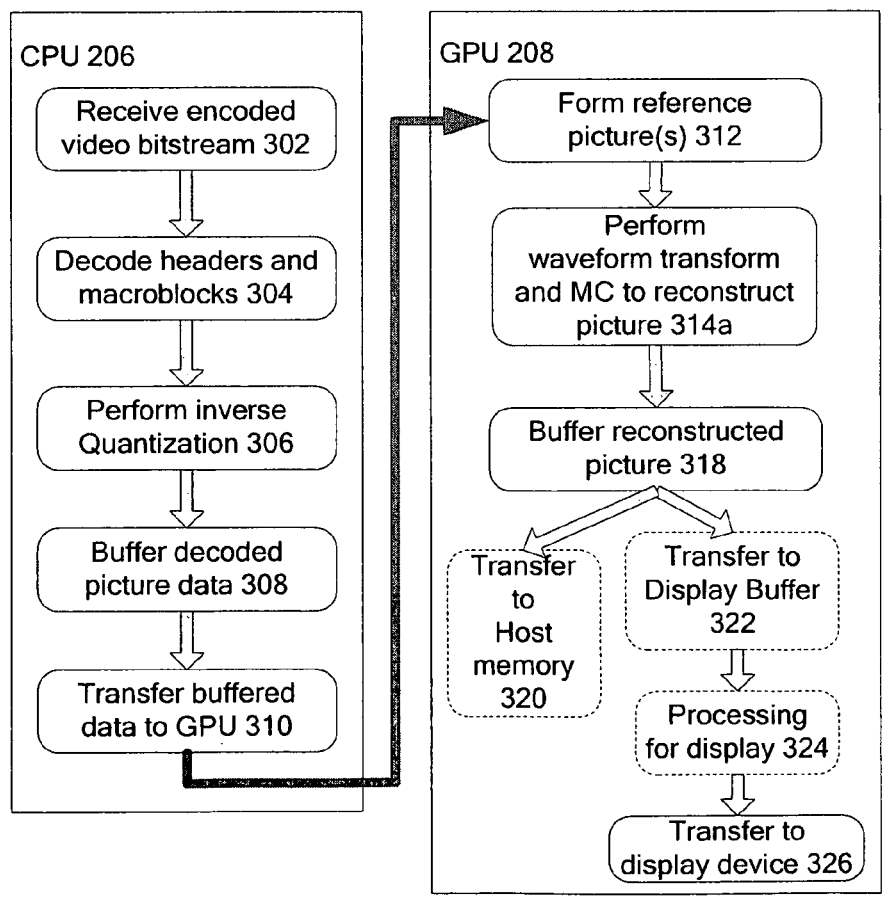
FIG. 16 an improved exemplary video decoding procedure utilizing the CUDA-based video decoding system.

FIG. 16 shows a correspondingly improved exemplary video decoding procedure utilizing the CUDA-based video decoding system, similar to FIG. 4. According to the embodiment shown in FIG. 15, the GPU tasks (inverse quantization IQ, waveform transform, and MC) are performed in a single kernel 314*a*. Thus, global storage space for the residual picture buffer can be saved.

The invention may be implemented using any one or more CPU and one or more CUDA based GPUs. However, one or more of, or even all, the Graphics Processing Units (GPUs) may also be operated based on an application programming interface (API) between GPU native instructions and a programming language. The invention may be implemented in software that assigns tasks to the one or more GPUs and CPUs. Such software is often stored and distributed on data carriers, such as optical discs. According to one aspect of the invention, a computer readable medium has stored instructions for causing a computer to perform a method as disclosed in one of the method claims. According to another aspect of the invention, an article of manufacture includes a machine readable medium that provides instructions that, when executed by a machine, cause the machine to perform operations comprising a method as disclosed in one of the method claims.

Further, the invention may also be applied to the decoding of video sequences of other video standards, such as MPEG-1, MPEG-4, H.264, etc.

The decoder can be used in video codecs, which are widely used in TV-quality digital video/audio applications such as digital TV (cable, satellite, and terrestrial broadcast), Video on Demand, Digital Versatile Disc (DVD), personal computing, card payment, test and measurement, etc.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections. Reference numerals appearing in the claims are by way of illustration only and shall have no limiting effect on the scope of the claims.

What is claimed is:

1. A method for decoding encoded video data on a hardware architecture that comprises a CPU (central processing unit) and a GPU (graphics processing unit), the GPU having a first buffer being a global buffer and a second buffer being a texture buffer, the method comprising steps of decoding on the CPU headers and macroblocks of the encoded video, wherein decoded picture data are obtained;

optionally performing inverse quantization on the decoded picture data;

transferring the decoded picture data or the inverse quantized picture data to the global buffer of the GPU;

and the method further comprising the following steps, being performed on the GPU:

inverse quantizing the transferred data, if said optional inverse quantization has not been performed on the CPU;

waveform transforming the inverse quantized data;

performing motion compensation, wherein reconstructed picture data are obtained, and further wherein one thread block is used to process a fixed number of picture blocks and one thread of said thread block is used to process all pixels on a row of pixels in said fixed number of picture blocks;

buffering the reconstructed picture data in the global buffer of the GPU;

determining if the decoded picture data are used as reference for decoding at least one further picture, and if so, then copying the decoded picture data from the global buffer to the texture buffer; and transferring the reconstructed picture data from the global or texture buffer towards a display.

2. Method according to claim 1, wherein the steps of inverse quantizing, waveform transforming and performing motion compensation that are performed on the GPU are processed in threads, and wherein threads have read-only access to the texture buffer, and read-write access to the global buffer.

3. Method according to claim 1, wherein in the step of performing motion compensation reference data from a previous picture are read from the texture buffer.

4. Method according to claim 1, wherein the picture data comprise luminance and chrominance components in one of a plurality of color space formats, and wherein the GPU operates on at least two parallel data layers, further comprising the steps of determining the color space format of the picture data;

depending on the determined color space format, if a first color space format was determined then storing and processing luminance data and chrominance data together in a single data layer, and if a different color space format was determined then storing and processing luminance data and chrominance data in two different separate data layers.

5. Method according to claim 4, wherein the GPU operates on at least three parallel data layers, and wherein the luminance and chrominance data of residual pictures are stored and processed in three different separate data layers and wherein the luminance and chrominance data of non-residual pictures are stored and processed in two different separate data layers.

6. Method according to claim 1, wherein the GPU uses the CUDA architecture.

7. Method according to claim 1, wherein the GPU is operated based on an application programming interface between GPU native instructions and a programming language.

8. Method according to claim 1, wherein in the step of performing a waveform transform only such coefficients are stored that are non-zero, together with their respective coefficient matrix indices.

9. Method according to claim 1, wherein the step of waveform transform is processed in one or more threads, the threads getting as input data a data set of constant length that comprises at least an address and a length value, the address pointing to a memory location within the global buffer where the actual input data for the thread are stored and the length indicating the amount of stored input data relating to the thread.

10. Method according to claim 1, wherein the steps of inverse quantization, waveform transform and motion compensation are processed together in a common thread.

11. Method according to claim 1, further comprising a step of initializing the waveform transform block, the initialization comprising the steps of:

allocating residual picture buffer, wherein residual picture data are allocated in the global memory; and preparing a constant matrix for iDCT calculation.

12. Method according to claim 11, further comprising the steps of determining which constant matrix is appropriate for a required waveform transform;

selecting the determined constant matrix; and switching to the selected matrix.

13. Method according to claim 1, further comprising the steps of determining the number of data blocks of a current residual picture; and adding fake data blocks until the number of data blocks is an integer multiple of the parameter RESIDUAL_BLOCK_BASE_NUM according to the employed video encoding standard.

14. Method according to claim 1, wherein in the step of motion compensation all residual picture data required in a thread are packed into one structure, and are read in one value-assignment operation.

15. Apparatus suitable for performing a method according to claim 1.

16. A non-transitory computer readable medium having stored thereon instructions for causing a computer to perform a method as claimed in claim 1.

17. Method according to claim 1, wherein in the step of transferring the decoded picture data or the inverse quantized picture data from the CPU to the GPU, only non-zero coefficients, motion vectors and block addresses are transferred.

18. Method according to claim 4, wherein the first color space format is 4:4:4, and said different color space format is one of 4:2:2 and 4:2:0.

* * * * *